United States Patent
Bhaskar et al.

(10) Patent No.: US 6,224,933 B1
(45) Date of Patent: May 1, 2001

(54) PROCESS FOR EXPANDED PELLET PRODUCTION

(75) Inventors: Ajay Rajeshwar Bhaskar; V. N. Mohan Rao; David Ray Warren, all of Plano, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/434,622

(22) Filed: Nov. 5, 1999

(51) Int. Cl.[7] .............................. A21C 3/04; A21C 11/16
(52) U.S. Cl. ...................... 426/559; 426/448; 426/454; 426/560
(58) Field of Search ................................. 426/559, 560, 426/448, 454

(56) References Cited

U.S. PATENT DOCUMENTS

| | | |
|---|---|---|
| 3,348,950 | 10/1967 | Weiss . |
| 3,600,193 | 8/1971 | Glabe . |
| 3,922,370 | 11/1975 | Prakash . |
| 4,137,161 | 1/1979 | Shimada . |
| 4,418,088 | 11/1983 | Cantenot . |
| 4,645,679 | 2/1987 | Lee . |
| 4,763,569 | 8/1988 | Wenger . |
| 4,778,690 * | 10/1988 | Sadel, Jr. et al. ................. 426/560 |
| 5,165,950 * | 11/1992 | Boehmer et al. ................. 426/559 |
| 5,429,835 | 7/1995 | Wenger . |
| 5,505,978 * | 4/1996 | Roy et al. ........................ 426/549 |
| 5,652,010 * | 7/1997 | Gimmler et al. ................. 426/549 |
| 5,932,264 | 8/1999 | Hurd . |

FOREIGN PATENT DOCUMENTS

| | | |
|---|---|---|
| 2082602 | 5/1993 | (CA) . |
| 4137161 | 5/1993 | (DE) . |
| 1147758 | 4/1969 | (GB) . |

OTHER PUBLICATIONS

Hoseney, R.C. 1996. Principles of cereal science and technology. 2nd Edition, American Association of Cereal Chemists, Inc., St. Paul, Minnesota, USA.

Fast, R.B. and Caldwell, E.R. 1990. Breakfast Cereals and How They Are Made. Amer. Assn. of Cereal Chemists, Inc., St. Paul, Minnesota, USA.

* cited by examiner

Primary Examiner—Nina Bhat
(74) Attorney, Agent, or Firm—Colin P. Cahoon; Carstens, Yee & Cahoon

(57) ABSTRACT

In the process of producing masa based expandable pellets, preconditioner steam and water addition, as well as extruder water and RPM, can be manipulated to precisely control the cook level, gelatinization, and moisture level of the meal during processing, and level of defects despite minor variation in the characteristics of the masa flour. Specifically, the preconditioner added steam-to-water ratio can be manipulated to effect cook, hydration, and partial gelatinization of the meal. In the extruder, lower extruder rotational speeds increase the residence time and increases cook. With the increase in residence time the volume of bed pack in the extruder increases. This can be reversed by adding water directly into the extruder, thereby decreasing the viscosity of the meal in the extruder. Product bulk density is changed by increasing and decreasing cook of the meal.

16 Claims, 1 Drawing Sheet

PROCESS FOR EXPANDED PELLET PRODUCTION

BACKGROUND OF THE INVENTION

1. Technical Field

The present invention relates to a process for producing expandable masa-based pellets and, in particular, to a process providing precise control of the processed masa cook level, moisture level, gelatinization and resultant product quality despite variations in the characteristics of the starting meal. The invention manipulates steam and water addition in the preconditioner and water addition and rotation speed in the extruder in order to achieve the appropriate processed meal characteristics at each stage.

2. Description of Related Art

The process for producing pellets as generally adapted in the food industry involves a very minimal cook of starch and forming a shape, such as a particular pasta shape, wherein the product is later cooked in the presence of excess water. Alternatively, cooked meal, such as pressure-cooked corn meal, can be used. The cooked mass is sheeted, cut, and dried for later frying.

Processes for producing masa-based pellets for use as a snack food product are well known in the art. For example, U.S. Pat No. 3,348,950 to Weiss describes a process for making snack food product by first mixing together corn, sucrose, water, and flavor developing ingredients. This mixture is combined with a second mixture of yellow corn grits, water, and sodium bicarbonate. The combined mixture is pre-cooked under pressure of 14 to 20 psi and temperatures between 247 and 259° F. The gelatinized dough is shaped, dried, and formed into pieces for deep-fat frying.

The method disclosed by the Weiss patent is a common process for producing corn meal based pellets that are fried and flavored. Common industry methods, however, are not adequate for the production of a masa-based pellet that expands or pops when fried to produce a light, crispy, and crunchy corn snack. For the purposes of this disclosure, an expanded pellet is one that increases in volume by upwards of 100% due to the rapid vaporization of water within the pellet during rapid heating of the pellet by, for example, deep frying.

Known methods for producing masa-based pellets do not provide the means for precisely controlling the cook level and degree of gelatinization at each stage in order to compensate for minor variations in the characteristics of the starting meal while at the same time inhibiting microbial growth by keeping all related processing temperatures high. When using prior art techniques at higher mixing temperatures, minor variations in the quality of the starting masa- flour meal can result in dramatic variations in the quality of the end product.

For example, conventional pellet production teaches extruding pellets after a relatively cool (around 120° F.) and long (8–15 minutes) preconditioning step that presents a homogenous hydrated mixture to the extruder with approximately 33% moisture. A disadvantage of the relatively cool temperature used during the preconditioning step is that it fosters microbial growth and requires frequent sanitation of the preconditioner. Conventional extrusion takes place at between 240 to 250 rpm with no water injection into the extruder. Raising the temperature of this process using prior art methods in order to counteract microbial growth results in a product that is overcooked. This typically results in the production of an unacceptable amount of "flats," which are pellets that did not appropriately expand when fried. The use of conventional processing methods at increased preconditioner temperatures also results in a process that is extremely sensitive to variations in the characteristics of the starting meal.

Accordingly, a need exists for a process for expanded pellet production that provides for precise control of cook level, hydration, gelatinization, and quality of the product in order to produce a uniform expanded corn-based snack while also maintaining elevated processing temperatures in order to control microbial growth and limit associated equipment downtime.

SUMMARY OF THE INVENTION

The proposed invention comprises a process for continuously producing masa-based expandable pellets of uniform quality despite minor variations in the characteristics of the incoming meal. The corn meal or masa flour is first admixed with minor ingredients, such as salt, sugar, sodium bicarbonate, and emulsifier. The admix is then flowed through a preconditioner for further mixing. Relative water and steam ratios and water temperature in the preconditioner can be varied to adjust the cook level of the product. The preconditioner is also maintained above a certain minimum temperature in order to discourage microbial growth.

When exiting the preconditioner, the product is a meal having a wet sand consistency. This meal is then routed to an extruder. Cook levels within the extruder are controlled primarily by the addition of water, which acts as a wetting agent or lubricant, thereby resulting in less residence time and lower cook levels. The excess water is removed from the extruder by a vacuum.

The product next goes to a die that produces a thin, uniform ribbon extrudate. This extrudate is cooled and, in one embodiment, split into two separate ribbons. The two separate ribbons are then run through an embosser and placed in contact while introduced into a cutter. Pliable pellets comprising two embossed layers adjoined at the cutting surfaces result at this stage.

The pellets are then dried. The pellets are shelf stable and, at this point, can be de- coupled from the final process. The pellets can then be later popped, for example, by immersion in a fryer, and seasoned to taste. Alternatively, the dried pellets can immediately proceed to a fryer or other cooking means in order to produce the expanded end product.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
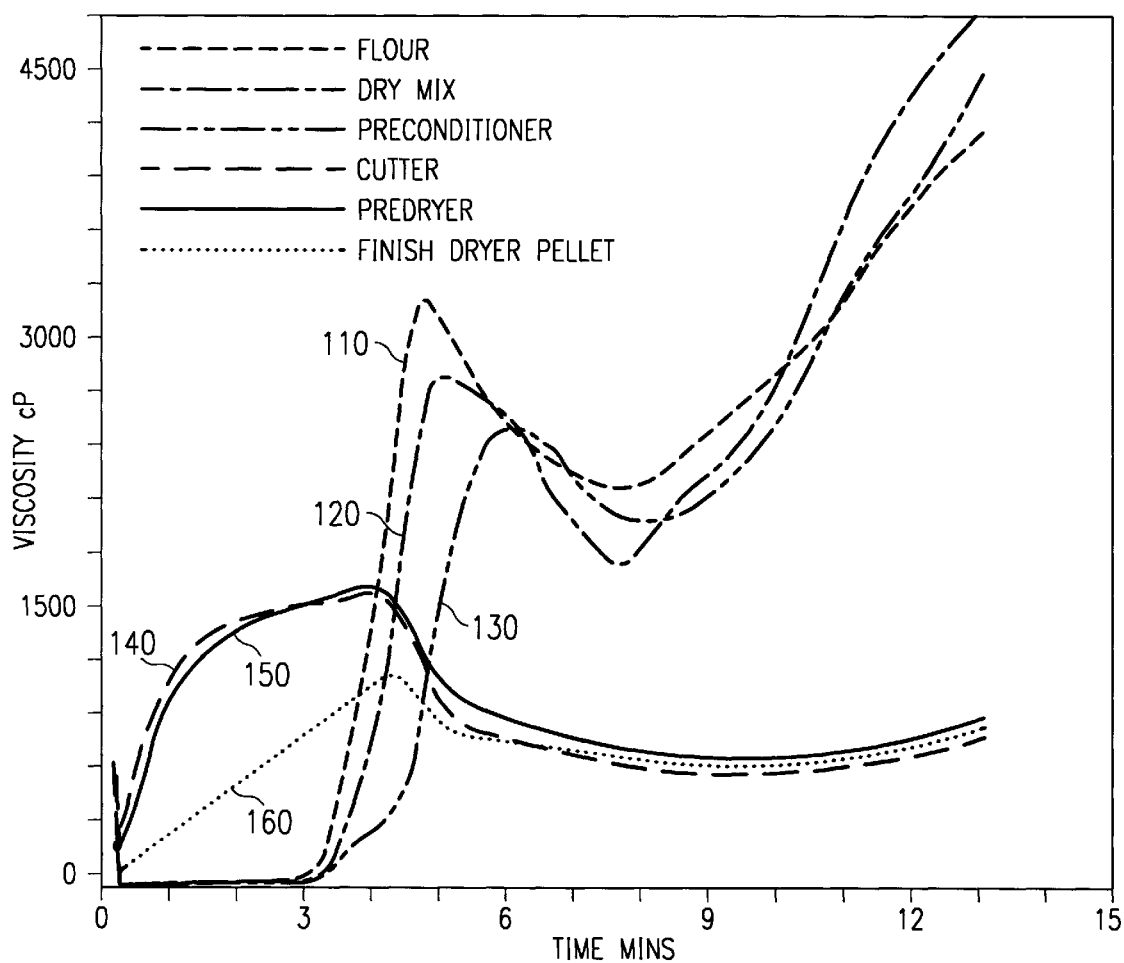
FIG. 1 is an RVA profile of product samples taken at various stages of one preferred embodiment of the invention.

Applicants' invention is an expanded pellet process that generates a half-product that is shelf stable and can be fried at a later time (up to 6 months). The major raw material is a ground, minimally precooked corn flour or masa flour that is mixed with preweighed minor ingredients, for example, sugar, salt, sodium bicarbonate, and emulsifier (mono and diglycerides).

The admix of masa flour and minor ingredients is volumetrically fed to a preconditioner, which is a twin shafted paddle mixer. In the preconditioner, water and steam are added to the dry mix to hydrate and partially gelatinize the mix prior to extrusion. During extrusion, the meal is first mechanically sheared and cooked and then cooled before passing through the die to form a thin wide ribbon. In one embodiment, the wide ribbon is slit into two individual ribbons which are embossed, laminated together, and cut into triangular shaped pellets. The pellets are fed to a rotary pre-dryer that prevents the formation of clusters during the initial drying phase. Pellets are pneumatically transferred to a finishing dryer in which the pellets are dried and tempered. Finally, the pellets are popped (rapidly expanded to a crispy puff snack) in a fryer or other cooking means, seasoned, and packaged.

The characteristics of the beginning masa flour can greatly influence the quality of the pellets produced by the invention. Consequently, it is important that relative standardization of the masa flour starting material be maintained throughout the process, in order to avoid the necessity of major adjustments to the process steps. In one preferred embodiment, the masa flour is a fine granulation masa flour made from lime-treated yellow corn. This masa flour has no added preservatives or incidental additives as process aids. Key performance attributes and descriptive attributes of one preferred embodiment of the starting masa flour is shown in Table 1 below.

TABLE 1

|  | Method | Sample Frequency | Unit of Measure | Low | Aim | High |
| --- | --- | --- | --- | --- | --- | --- |
| KEY PERFORMANCE ATTRIBUTES: |  |  |  |  |  |  |
| Moisture (130° C. for 60 min)[2, 3] | AOAC 14.004[5] | S | % | 10 | 11.5 | 13 |
| Moisture Cpk | ASQC | see 5 | Cpk | 0.67 | 1.33 | na |
| RVA[2] at 80° C. | TBD | S | Peak | 2800 | 3100 | 3400 |
| RVA Peak Cpk | ASQC | see 5 | Cpk | 0.67 | 1.33 | na |
| Particle Dist. (Through #100) Pan[2] | FL 70-12 | % | % | 5 | 10 | 15 |
| Particle Dist. Cpk (Through #100) Pan[2] | ASQC | see 5 | Cpk | 0.67 | 1.33 | na |
| DESCRIPTIVE ATTRIBUTES: |  |  |  |  |  |  |
| pH[2] | FL 60-04 | S | % | 6.8 | 7 | 7.2 |
| Fat[2, 3] (Soxlet, Chloroform extraction) | FL 30-50 | S | % | 2 | 3 | 4.5 |
| Particle Dist. (Screen #25)[2] | FL 70-12 | S | % | 0 | 0 | — |
| Particle Dist. (Screen #40)[2] | FL 70-12 | S | % | 0 | 0 | <0.1 |
| Particle Dist. (Screen #60)[2] | FL 70-12 | S | % | 20 | 25 | 35 |
| Particle Dist. (Screen #80)[2] | FL 70-12 | S | % | 35 | 40 | 45 |
| Particle Dist. (Screen #100)[2] | FL 70-12 | S | % | 10 | 15 | 20 |

TABLE 1-continued

|  | Method | Sample Frequency | Unit of Measure | Low | Aim | High |
| --- | --- | --- | --- | --- | --- | --- |
| Extraneous Matter | FDA | S | % | 0 | — | FDA |
| Extraneous Matter - Live Insects | Visual | S | count | 0 | 0 | 0 |

[1]8th Edition [2]Reported on the C.O.A. [3]Monitored using SPC [4]Neogene, Vicam or FDA recommended B = Batch L = Lot P = Period 5B = Each 5th batch S = Shipment During the initial admixing of the starting masa and minor ingredients, the masa flour is first weighed and then the minor ingredients, which have previously been weighed, are added. The composition of the resultant admix for one preferred embodiment given the weight of the starting materials is reflected in the following Table 2.

TABLE 2

|  | SETPOINT |  | PERCENT |
| --- | --- | --- | --- |
| Pre-Cooked Corn Flour | 450.00 | lbs. | 95.92% |
| Salt | 4.00 | lbs. | 0.85% |
| Mono/Diglyceride | 1.20 | lbs. | 0.26% |
| Sodium Bicarbonate | 1.86 | lbs. | 0.41% |
| Granulated Sugar | 12.00 | lbs. | 2.56% |
| TOTAL | 469.10 | lbs. | 99.98% |
| BLEND TIME | 420 | sec. |  |

The batch is mixed, for 7 minutes in a Ruberg model VM-400 mixer in one embodiment, and then discharged into a surge hopper. After being pneumatically transferred, the admix is fed volumetrically to a preconditioner.

The primary purpose of pre-conditioning is to hydrate and partially gelatinize the mix. Meal enters at approximately 12% moisture weight basis and exits at approximately 28%. Hydration is accomplished by injection of both steam and water. The ratio of steam to water is adjusted depending on the "gelatinization level" of the entering masa flour (determined by Rapid Visco-Analyzer, "RVA") and the degree of expansion later observed in the popped pellets. However, the total combined weight of the water and steam is maintained in order to achieve a consistent moisture level of the meal as it exits the preconditioner. The water that is added is preheated typically to 150–160° F. to maintain the exit temperature of the meal at 160° F., which is adequate to inhibit microbial growth within the preconditioner. A hot water jacket around the preconditioner can also be used to moderate and control the temperature level of the meal. The mean residence time is between 60 to 90 seconds, however, the residence time distribution in this type of mixer is typically very wide. An acceptable preconditioner is a co-rotating twin shaft paddle mixer of 1000 liter capacity manufactured by Clextral, Inc. of France.

Even with relatively narrow quality and characteristic standards followed with regard to the starting masa flour, Applicants' process requires the ability to precisely control the cook level of the admix as it proceeds through the process. The most powerful tool for controlling the cook level and resulting quality of the product is the adjustment of injected heated water and steam levels in the preconditioner. The ratio between steam versus hot water introduced into the preconditioner can be varied while still maintaining the same mass of water introduced into the preconditioner. The steam added to the preconditioner, specifically, has the most influence on the cook level of Applicants' process, since the steam adds considerably more energy per pound than heated water. Steam additionally provides a high degree of diffusion within the meal. This allows for easy hydration and adhesion and uniform distribution. The moisture added in the form of steam is bound to the meal more so than added water in the later described extruder step. A typical steam addition rate for Applicants' process is 90 lbs. per hour with an admix flow to the preconditioner of 2,200 lbs. per hour. However, in one preferred embodiment, steam addition ranges from 30 lbs. per hour to 150 lbs. per hour. The water added in the preconditioner is maintained such that the sum of steam and water will yield a moisture level of the preconditioned admix of between 27 and 29%. The ability to adjust the heat added to the preconditioner by varying the ratio of steam to hot water, and to a lesser extent the temperature of the hot water, is a critical control feature to Applicants' invention.

In one embodiment of applicant's invention, it is desirable to have the admix depart the preconditioner at approximately 160° F. This temperature is desired primarily to inhibit microbial growth, thereby allowing the preconditioner to run continuously for long periods of time, such as several days, between cleanings. The incoming water temperature can be adjusted to bring the exit temperature of the admix to the appropriate range without radically affecting other process parameters.

The admix departs the preconditioner as a hydrated and partially gelatinized meal that is of a wet sand consistency. An RVA profile of the admix at this stage, prior to entering the extruder, is shown in FIG. 1. An RVA profile is generated by a Rapid Visco-Analyzer, which is a method well-known in the food industry for investigating hydration and gelling behavior of starches by characterizing the viscosity of a given sample. The method typically involves controlled heating and cooling of flour or starch suspensions in water at concentrations of 5 to 40% w/w. A solid concentration of about 12% w/w is used for all of the RVA profiles shown in FIG. 1. The X-axis of FIG. 1 shows the method time in minutes, and the Y-axis shows the tested viscosity in centipoise.

The RVA profile 130 for the admix as it departs the preconditioner is shown in FIG. 1. Also shown in FIG. 1 is an RVA profile 110 for the initial starting masa flour and an RVA profile 120 for the admix prior to entering the preconditioner. It should be understood that all of the RVA profiles shown in FIG. 1 are generated by samples of one embodiment of the invention and are shown to illustrate the viscosity characteristics of the product of this one embodiment of this invention. These RVA profiles are not intended to limit the invention to products that exhibit identical RVA profiles at the various stages shown.

The preconditioned admix is next fed into an extruder. The extruder, in one preferred embodiment, is a Clextral BC-72H twin screw extruder with a shaft bore of 88 mm, L/D ratio of 30, and consists of nine barrel zones. The prehydrated meal and additional water are fed into the first zone. Barrel zones 1 through 5 are heated to help achieve the desired level of "cook" by mechanical and thermal means. Barrel zones 6 through 9 are cooled to minimize extrudate die temperature and to help reduce steam flashing at the die which produces undesirable bubbles in the resulting extrudate ribbon. A vacuum vent is attached to zone 6 to provide evaporative cooling of the extrudate. Typical vacuum level achieved is 16 inches of mercury, and the evaporation rate is 60 pounds of water per hour.

Another quality control feature of Applicants' invention is the variation of water added to the extruder. Since the meal has been hydrated in the preconditioner and excess water can be removed by the vacuum, the addition of water acts as a lubricant to the meal, reducing its viscosity and, thereby, reducing the residence time of the meal in the extruder. This in turn reduces the torque required to transfer the less viscous product through the extruder. Consequently, the addition of water to the extruder reduces the cook level.

A smaller, but noticeable, effect is the variation of the rotation speed of the extruder. As the rotation speed increases, it has been observed that the residence time of the meal decreases such that the cook level of the meal decreases as well. Experimentation has shown that lower extruder rpm results in more bed pack, longer residence time, and more uniform (with respect to time) flow out of the die. It is believed that the degree of cook of the extrudate is slightly higher at a lower rpm than at a higher rpm, which is contrary to conventional teaching in the field. In one embodiment, a typical operating range for the extruder is between 350 to 380 rpm.

The extrudate, in one embodiment of Applicants' invention, is next fed through a single 60 inch wide coathanger style die with adjustable choker bars and die lips. Non-uniformity across the width is minimized by fine tuning of the die lips. Overall, or average, ribbon thickness is controlled by manipulating the speed of a pair of vertically opposed tension rolls. The tension rolls are used to pull the ribbon from the die face which causes the ribbon to stretch and neck-in to a small degree (down to 58 inches). Nominal ribbon thickness is 0.035 inches and is measured after proceeding through a conditioning tunnel by an online traversing laser sensor, as well as manually with a Mitutoyo thickness gauge. Uniform ribbon thickness is critical to insure uniform popped product at the fryer stage.

The ribbon at the die face is very pliable, but quickly stiffens into a sheet that can be mechanically manipulated without significant deformation to the ribbon and yet remains somewhat flexible. The ribbon enters a cooling tunnel that supplies cold air at approximately 6 m/s to both sides of the ribbon. Air temperature in the tunnel is manipulated to achieve an aim ribbon temperature of 80° F. at the embosser. Cooling of the ribbon is required to prevent the ribbon from wrapping on the embosser rolls or cutter.

After the ribbon exits the cooling tunnel, the ribbon passes over a slitter, which slits the ribbon into two ribbons of equal width. The slitter is a rotating circular knife (similar to a pizza cutter), located beneath the sheet, that cuts the ribbon against a stationary plastic backing roll. The alignment of the ribbon relative to the slitter, in one embodiment, is manually achieved by adjusting the position of the slitter to the center line of the ribbon.

In an alternative embodiment to the slitter method described above, two parallel extruders can be used to produce two parallel ribbons. These two parallel ribbons then proceed as described below with regard to the two equal width sheets slit from a single extrudate.

After being slit into two equal width sheets, the ribbons drop onto two different panning conveyors that deliver the ribbon to separate embosser anvil roll pairs. Alignment of the ribbons into the embosser/cutter unit operation is accomplished by manually adjusting the panning conveyors. The embosser cuts a cross hatch or other selected pattern into the still pliable ribbon prior to cutting and drying. Embossing affects the final shape and degree of expansion that the pellet will have on popping. The embosser roll has a series of circumferential and cross grooves cut into the surface of the roll. The ribbon is embossed by passing through the nip between the embossing roll and a smooth surfaced anvil roll. The depth of embossing for each sheet is in the range of 0.021 to 0.031 inches (thus leaving between 0.004 and 0.014 inches of material thickness in the valleys of the embossed ribbon). After each individual sheet has been embossed, the ribbons are brought together in the nip of the cutter and anvil. The embossed surfaces form the exterior surfaces of the pellet. The cutter is a rotary die that serves two functions, both cutting and laminating the pellets. The radius of the cutter flutes laminates the outside edges of the triangles while the land area "crush cuts" the pellets from the ribbons. Cut pellets are ejected and conveyed to a pre-dryer. An RVA profile 140 of the pellets prior to entering the pre-dryer is shown in FIG. 1.

The entire width of the laminated ribbon cannot be cut into pellets when producing a triangular shape pellet. This remaining portion is referred to as edge lace. The edge lace is chopped and then ground into pieces that are approximately 0.125×0.125×0.080 inches in size and is referred to as regrind. The regrind, in one embodiment, is recycled back into the process at the inlet to the preconditioner at a rate of 8–10% by weight of the total meal feed rate.

The pellets are pneumatically transferred from the cutter discharge to a rotary pre-dryer entering with a moisture of 26.5%. The rotary dryer can consist, for example, of a 3.5' diameter rotating auger that is welded to a perforated drum. Ambient air is pulled in through the inlet and outlet of the rotary dryer, heated with steam coils, then passed through the product bed. The pellets leave the rotary dryer at a moisture of 23.5%. The purpose of the rotary dryer is to dry the surface of the pellets to prevent clumping when the pellets are bedded in a finishing dryer. An RVA profile 150 of the pellets as they leave the pre-dryer is also shown in FIG. 1.

The pellets are pneumatically transferred from the rotary dryer to a finishing dryer. One preferred embodiment uses a five pass, three zone finishing dryer. The finishing dryer consists of three zones. Zones one and two are drying zones and zone three is the tempering zone. The tempering zone is used to equilibrate the moisture gradients within the pellets. The pellets are spread onto a first belt with an oscillating spreader. There is an ambient cooler at the end of zone 3 to cool the pellets to room temperature before exiting the dryer. The moisture level of the pellets as they leave the dryer is approximately 11.5% to 13.5%, which allows for a long shelf life of the pellets.

FIG. 1 shows an RVA profile 160 of the finished and dried pellet. The pellets can be continuously fed into the fryer from this point. Alternatively, the pellets can be decoupled from the remaining process steps and stored for later frying. The pellets are shelf stable and can be fried as long as six months after originally produced.

Pellets are submerged the entire time they are in the fryer to ensure uniform frying of both pellet surfaces. Fryer temperature is manipulated to effect the expansion of the pellets. Bulk density is measured on-line after the fryer prior to seasoning.

The fried base is oil sprayed and seasoned in a rotating drum typical of corn chip processing. The expanded and seasoned product is then packaged by, for example, a vertical form and fill machine.

While the invention has been particularly shown and described with reference to a preferred embodiment, it will be understood by those skilled in the art that various changes in form and detail may be made therein without departing from the spirit and scope of the invention.

What is claimed is:

1. A method for making an expanded corn-based pellet comprising the steps of:
   (a) passing corn meal through a preconditioner:
   (b) adding steam and hot water to the corn meal while in the preconditioner in order to control the cooking of said corn meal and maintain temperature levels in the preconditioner sufficient to inhibit microbial growth in the preconditioner but below 175° F.;
   (c) passing said corn meal through an extruder; and
   (d) adding water to the extrudate to control the cooking of the extrudate.

2. The method of claim 1 wherein step (d) further comprises manipulating the rotational speed of the extruder in order to further control the cooking of the extrudate, with the cook level increasing with decreasing rotational speed.

3. The method of claim 1 wherein the total weight of the water and steam added at step (b) per weight of corn meal passing through the preconditioner is constant in order to achieve a constant moisture level of the meal as it exits the preconditioner.

4. The method of claim 3 wherein the moisture level of the corn meal as it exits the preconditioner is between 27 and 29% by weight.

5. The method of claim 1 wherein the exit temperature of the corn meal from the preconditioner is above 155° F.

6. The method claim 1 further comprising:
   (e) passing the extrudate through a die to form a thin, wide ribbon of uniform thickness; and
   (f) forming said extrudate into triangular shaped pellets by laminating two ribbons of extrudate together.

7. The method of claim 6 wherein said triangular shaped pellets comprise a moisture content of approximately 11.5% to 13.5%.

8. An expanded pellet prepared by the process of claim 1.

9. An expanded pellet comprising:
   masa flour;
   minor ingredients;
   wherein said pellet is produced by mixing said masa flour and minor ingredients to form a meal, passing said meal through a preconditioner, adding steam and water to said preconditioner to control the cooking of said meal and to maintain temperature levels sufficient to discourage microbial growth in the preconditioner but below 175° F., feeding said meal from the preconditioner into an extruder, and adjusting the level of cook imparted on the meal by the extruder by adding water to the extrudate.

10. The expanded pellet of claim 9 wherein the level of cook of the extrudate is controlled by manipulating the rotational speed of the extruder, with a higher speed resulting in a lower cook level and a lower speed resulting in a higher cook level.

11. The expanded pellet of claim 9 wherein the total weight of the water and steam added to the preconditioner per weight of meal passing through the preconditioner is constant in order to achieve a constant moisture level of the meal as it exits the preconditioner.

12. The expanded pellet of claim 9 wherein the moisture level of the meal as it exits the preconditioner is between 27 and 29% by weight.

13. The expanded pellet of claim 9 wherein the meal exits the preconditioner at a temperature above 155° F.

14. The expanded pellet of claim 9 wherein the extrudate is passed through a die to form a thin, wide ribbon of uniform thickness, and is then formed into triangular shaped pellets by laminating two ribbons of extrudate together.

15. The expanded pellet of claim 14, wherein said triangular shaped pellets comprise a moisture content of approximately 11.5% to 13.5%.

16. The expanded pellet of claim 9 wherein the pellet is popped in a fryer.

* * * * *